No. 756,872. PATENTED APR. 12, 1904.
J. MELCHER.
HOISTING AND CARRYING MACHINE.
APPLICATION FILED OCT. 9, 1903.
NO MODEL. 2 SHEETS—SHEET 1.
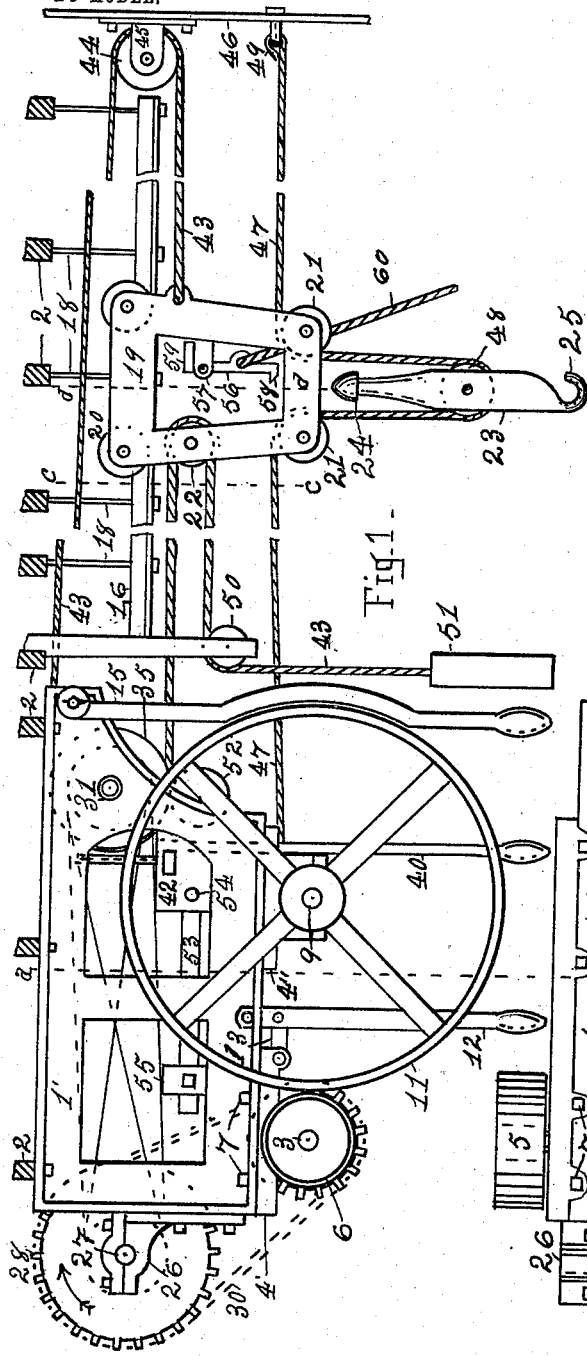
WITNESSES:
E. M. Albee.
S. E. Stein
INVENTOR
John Melcher
BY
G. H. Albee.
ATTORNEY No. 756,872. PATENTED APR. 12, 1904.
J. MELCHER.
HOISTING AND CARRYING MACHINE.
APPLICATION FILED OCT. 9, 1903.
NO MODEL. 2 SHEETS—SHEET 2.
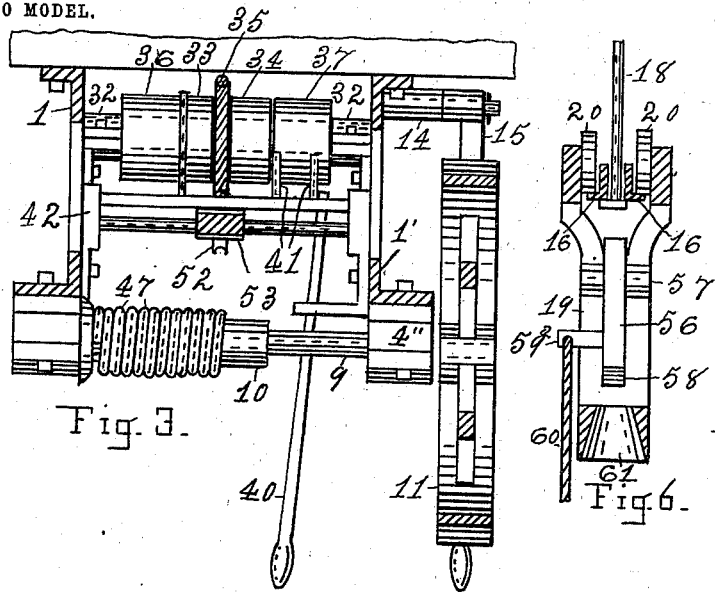
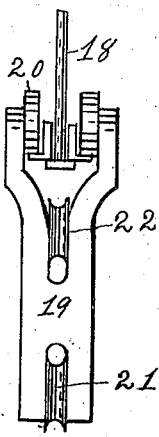
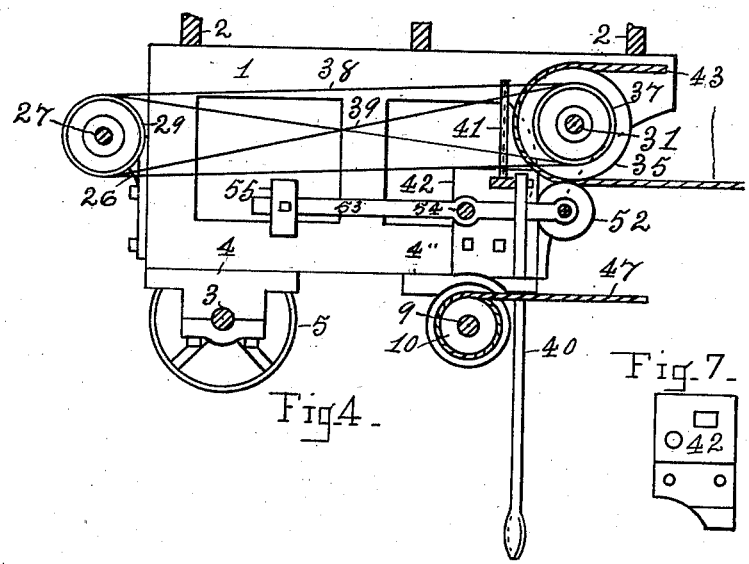
WITNESSES:
INVENTOR
John Melcher
BY
ATTORNEY No. 756,872.

Patented April 12, 1904.

UNITED STATES PATENT OFFICE.

JOHN MELCHER, OF APPLETON, WISCONSIN.

HOISTING AND CARRYING MACHINE.

SPECIFICATION forming part of Letters Patent No. 756,872, dated April 12, 1904.

Application filed October 9, 1903. Serial No. 176,344. (No model.)

*To all whom it may concern:*

Be it known that I, JOHN MELCHER, a citizen of the United States, residing at Appleton, in the county of Outagamie and State of Wisconsin, have invented a new and useful Improvement in Hoisting and Carrying Machines, of which the following is a specification.

My invention relates to hoisting and carrying machines which are designed for use in factories for canning vegetable food products, where the cans containing said products require to be carried—a large number at one time in a suitable receptacle—from the place where the filled cans are soldered to a hot-water tank, immersed therein for being properly cooked, and then after cooking the required time lifted out and carried to the place for the next operation in the canning process; and the object of my improvement is to provide a mechanism which is simple in construction, has few parts, and can be operated by a person standing in substantially one position within reach of all of its operating and belt-shifting levers, said mechanism being illustrated in the accompanying drawings, in which—

Figure 1 is a side elevation of the device, parts of the carrying-track and of the ropes being broken away for want of room for showing the length thereof which would be necessary in actual use, said length being usually unlike in different factories. Fig. 2 is a plan of the same. Fig. 3 is a vertical section transversely of Figs. 1 and 2, taken upon the line $a\,a$, as seen in looking to the right of said line. Fig. 4 is a vertical section longitudinally of the principal mechanism as seen beyond the line $b\,b$ of Fig. 2. Fig. 5 is an end elevation of the carrying track and car as seen in looking to the right of the line $c\,c$ of Fig. 1. Fig. 6 is a vertical section of the car upon the line $d\,d$ of Fig. 1 as seen in looking to the right. Fig. 7 is a plan of a supporting-plate in which the belt-shifting bar and a tightener-supporting shaft is held. Figs. 5 and 6 are upon a larger scale than the other figures.

Similar numerals indicate like parts in the several views.

1 and 1' indicate a pair of frame-pieces which are to be bolted to overhead joists 2 of the room, said frame-pieces being spaced apart and supporting several shafts and pulleys.

3 is the main driving-shaft, which is journaled in boxes 4 and 4' and has mounted upon one end the pulley 5, by which said shaft may be driven from any convenient source of power. Upon the opposite end of said shaft a friction-pulley 6 is secured, said end of the shaft being journaled in the box 4', which is bolted to the lower flange of the frame-piece 1', with bolts 7 for sliding longitudinally of the frame, the box or flange of the frame being slotted, as the slots 8, for permitting said sliding movement.

A shaft 9 is journaled in suitable boxes 4'', which, like the boxes 4 and 4', are secured to the lower flange of the pieces 1 and 1'. Between the frame-pieces a spool 10 is secured upon the shaft 9, and upon the projecting end of the shaft a pulley 11 is secured for being engaged with the friction-pulley 6. A lever 12 is suspended from the lower flange of the frame-piece 1' and is connected by a link 13 with the sliding box 4' for sliding said box and bringing the faces of the pulleys 6 and 11 into frictional engagement, and thereby revolving the spool 10.

Pivoted upon a boss 14 upon the frame 1' is a brake-lever 15, which normally hangs out of contact with the rim of the pulley 11, but can be swung into contact with it for the gradual lowering of any weight which a rope upon the spool 10 by the revolutions thereof may have raised.

The foregoing parts of the mechanism which have been described constitute the principal hoisting and lowering mechanism of this invention. At the right of the frame-pieces a track is arranged which extends from near said frame-pieces parallel with them to any required distance, said track consisting of two angle-irons 16 and 16, which are spaced apart by blocks 17 and may be riveted together through said blocks. Bolts 18, which depend from overhead timbers 2, pass through the space 17 and support said rails upon the heads of said bolts. A car 19 is arranged to run upon said track, it being provided with two truck-wheels 20 for each rail, with two sheave-pulleys 21 and one idler-pulley 22 and also with mechanism for the engagement and disengagement with it of a single sheave-block 23, said block being provided with a pointed T-head 24 for connection with the lower part of the car and with a hook 25, with which to engage with anything to be lifted.

Mounted in the bracket journal-boxes 26 at the left of Fig. 1 is a shaft 27, having secured thereon a sprocket-wheel 28 and a pulley 29. A detachable chain 30 connects the wheel 28 with a smaller one $28^a$ upon the shaft 3, by means of which the shaft 27 is driven, but at a slower speed. Near the opposite end of the frame-pieces a shaft 31 is arranged for revolution in boxes 32, which are bolted to the frame-pieces, said shaft having secured thereon pulleys 33 and 34 and a grooved rope-pulley 35 and having mounted thereon loose pulleys 36 and 37.

By means of the straight belt 38 and cross-belt 39 and a belt-shifting bar 40, arranged to slide transversely of the frame in the plates 42, which are bolted to the frame-pieces, the shaft 31 and rope-pulley 35 can be made to revolve in either direction. The shifting bar is provided with pins 41 for engaging the edges of the belts.

The lifting-rope 47 is secured at one end to the spool 10, the other end extending to and over one of the sheave-pulleys 21, thence down and around the sheave-pulley 48 and up over the other sheave-pulley 21, and then to a fixed part 49 upon the wall of the building.

For driving the car in either direction a rope 43 is secured to the right-hand end of the car, then passed over the idler-pulley 44, which is mounted for revolution upon the bracket 45, which is secured to the post 46, thence to and over the pulley 35, and then to the car with which it is engaged. As ropes of the kind commonly used in canning and similar factories are made of material which is liable to stretch, especially if in a room where the air is saturated with steam, provision is here made for the continual keeping of the rope for drawing the car taut. This is accomplished by passing the rope over the idler-pulley 22, thence over the single block-pulley 50, below which a weight 51, sufficiently heavy to draw the rope taut, is suspended from said rope.

For increasing the traction-power of the pulley 35 another grooved pulley, 52, revoluble within the frame 53, is arranged for pressing the rope 43 tightly against the groove of the pulley 35.

The frame 53 is arranged to oscillate upon the shaft 54 and is provided with a weight 55, adjustable in position thereon for increasing or diminishing the pressure of the pulley 52 upon the rope. The shaft 54, upon which the frame 53 oscillates, is shown as being supported in the plates 42.

The carrying-car and its track is somewhat similar to the horse-power hay-fork carriers in common use, and no claim is now made for a carrier of that class; but the application of the device for holding the rope taut is believed to be new. The sheave-block 23 is provided with a pointed end 24 for engaging the car through the tapering aperture 61, a latch 56 being pivoted in the bracket-arm 57 and provided with a catch 58 for engaging with the pointed T-head 24. Other means for engaging the sheave-block 23 and car may be used, as they are in common use in hay-carriers of hay-forks. In the present case the latch 56 is provided with an angle extension 59 for engaging the bracket 57 and holding the latch normally in position for permitting the T-head of sheave-block to properly enter through the aperture 61 and engage the catch 58 and be held suspended by it until released by the operator. For effecting this release an arm $59^a$ is extended out from the latch, to which a rope 60 is attached, the pulling of which rope by the operator releases the latch from the T-head and allows the weight which may be sustained by said block to be lowered, the speed at which it is lowered being controlled by means of the brake-lever upon the pulley 11.

The operation of the device is as follows: By means of the brake the sheave 23 is lowered for engaging its hook 25 with the article to be lifted. After its engagement the weight is raised to the proper height for the engagement of the T-head and catch 58, when said article can be carried along horizontally or up or down an incline, as desired, until the point is reached for its being lowered to the floor or other place of deposit, said carrying being done by means of the rope 43 around the grooved pulley 35. Upon arriving at the place of deposit the operator pulls the rope 60 and at the same time applies the brake to the pulley 11 and gradually lowers the article carried.

Having described my invention, what I claim, and desire to secure by Letters Patent, is—

1. In a rope-transmission car-running mechanism for canning and similar factories, a driven shaft, means for driving said shaft in either direction, a single-groove rope-pulley secured to said shaft, a track arranged substantially at right angles with said shaft, a car arranged to run upon said track, an idler-pulley mounted for revolution in a fixed position beyond said car, a rope having one end secured to one end of said car, thence extending to and over said idler-pulley and to and over the single-groove rope-pulley of said driven shaft, thence to and over an idler-pulley of said car, returning toward said single-groove rope-pulley and passing over the sheave of a fixed single sheave-block, and a weight secured to the end of the rope of sufficient amount for taking up any slack in said rope, substantially as described.

2. In a rope-transmission car-running mechanism for canning and similar factories, a driven shaft, a single-groove rope-pulley secured to said shaft, a track arranged substantially at right angles with said shaft, a car arranged to run upon said track, an idler-pulley mounted for revolution in a fixed position near the end of said track, a rope having one end secured to one end of said car, thence extending to and over said idler-pulley and to and over said single-groove rope-pulley and then to the opposite end of said car, in combination with a second grooved rope-pulley arranged to press said rope against the groove of the first-named rope-pulley, substantially as set forth.

3. The combination of a driven shaft suitably arranged for revolution, a friction-pulley thereon, a second shaft arranged for revolution parallel with the first-named shaft having a rope-winding spool thereon and a pulley adapted to be engaged frictionally with the first-named pulley, a lever arranged for engaging the friction-faces of said pulleys, a brake arranged for lowering any weight which a rope upon said spool may have raised, a track arranged substantially at right angles with said shafts, a car arranged to run upon said track, two sheave-pulleys arranged in the lower part of said car, a single sheave-block arranged below said car having a hook at its lower end, means for the engagement of said block with the car when the block is raised to a predetermined point, a rope having one end secured to a fixed part, thence extending to and over one of the sheave-pulleys of said car, thence descending to and around the pulley of said single sheave-block and up and over the second sheave of the car, thence extending to and being secured around the aforesaid spool, a car-running mechanism comprising a third shaft arranged to be revolved from the first-named shaft, and having secured thereon a pulley, a fourth shaft arranged for revolution having suitable pulleys and belts for its being revolved in either direction, a single-groove rope-pulley secured to said shaft, an idler-pulley mounted for revolution in a fixed position at a distance from said rope-pulley and beyond the aforesaid car, a rope secured to one end of said car, thence extending to and over said idler-pulley and to and over said single-groove pulley upon the aforesaid shaft and then to the opposite end of said car and over an idler-pulley therein, returning toward said single-groove rope-pulley and passing over a sheave in a fixed single sheave-block, and a weight secured to the end of said rope of sufficient amount for taking up any slack in said rope, a second single-groove rope-pulley arranged to press said rope against the groove of the first-named rope-pulley, and means operative by the workman for releasing said single sheave lifting-block from engagement with said car when the car has been run to the desired point, substantially as described.

JOHN MELCHER.

Witnesses:
W. K. DELANO,
F. C. WEED.